United States Patent
Berendt

(10) Patent No.: US 8,820,748 B2
(45) Date of Patent: Sep. 2, 2014

(54) SEALING SYSTEM FOR A TURBOMACHINE

(75) Inventor: Oliver Berendt, Görlitz (DE)

(73) Assignee: Siemens Aktiengesellschaft, Munich (DE)

( * ) Notice: Subject to any disclaimer, the term of this patent is extended or adjusted under 35 U.S.C. 154(b) by 985 days.

(21) Appl. No.: 12/287,183

(22) Filed: Oct. 7, 2008

(65) Prior Publication Data

US 2009/0091088 A1    Apr. 9, 2009

(30) Foreign Application Priority Data

Oct. 8, 2007 (EP) .................................. 07019667

(51) Int. Cl.
| | |
|---|---|
| *F16J 15/447* | (2006.01) |
| *F01D 11/00* | (2006.01) |
| *F04D 29/16* | (2006.01) |
| *F16J 15/32* | (2006.01) |
| *F04D 29/02* | (2006.01) |

(52) U.S. Cl.
CPC ........ *F01D 11/001* (2013.01); *F05D 2300/501* (2013.01); *F04D 29/164* (2013.01); *F16J 15/3288* (2013.01); *F01D 11/003* (2013.01); *F05D 2240/55* (2013.01); *F05D 2300/614* (2013.01); *F16J 15/3224* (2013.01); *F04D 29/023* (2013.01)
USPC ...................................... 277/412; 415/173.7

(58) Field of Classification Search
USPC ......... 277/303, 305, 307, 383, 411, 422, 413, 277/414, 412, 415, 404, 405, 627, 537, 277/407; 415/135, 139, 173.3, 173.5, 415/173.7, 174.2, 174.5
See application file for complete search history.

(56) References Cited

U.S. PATENT DOCUMENTS

| 3,185,489 | A | * | 5/1965 | Klinger-Lohr | ................ | 277/399 |
| 3,924,862 | A | | 12/1975 | Houston | | |
| 3,942,862 | A | | 3/1976 | Furukawa et al. | | |
| 4,989,886 | A | * | 2/1991 | Rulis | ............................. | 277/355 |
| 5,303,935 | A | * | 4/1994 | Saksun | ......................... | 277/567 |
| 5,509,669 | A | * | 4/1996 | Wolfe et al. | ................... | 277/654 |
| 5,657,998 | A | | 8/1997 | Dinc et al. | | |
| 5,983,707 | A | * | 11/1999 | Gillbe | ............................ | 73/37.7 |
| 6,142,731 | A | * | 11/2000 | Dewis et al. | ................... | 415/136 |
| 6,367,812 | B1 | * | 4/2002 | Reinhardt et al. | ............ | 277/572 |
| 6,722,850 | B2 | * | 4/2004 | Burdgick | ....................... | 415/230 |
| 6,971,844 | B2 | * | 12/2005 | Burdgick | ....................... | 415/139 |
| 2003/0039542 | A1 | * | 2/2003 | Cromer | ......................... | 415/135 |
| 2004/0240986 | A1 | | 12/2004 | Burdgick | | |
| 2006/0029494 | A1 | * | 2/2006 | Bruce et al. | ................... | 415/160 |

FOREIGN PATENT DOCUMENTS

| DE | 26 03 867 | A1 | 6/1977 |
| GB | 544732 | | 4/1942 |
| GB | 565649 | A | 11/1944 |
| GB | 656649 | | 11/1944 |

\* cited by examiner

*Primary Examiner* — Vishal Patel
*Assistant Examiner* — Michael Wills, III

(57) ABSTRACT

A sealing system for a turbomachine for sealing an annular gap between a rotor and a stator of the turbomachine has a sealing body which can be inserted into the annular gap and can bridge the latter, said sealing body being embodied elastically and thereby able to compensate for a height variation of the annular gap, and at least one sealing ring which is embedded in the sealing body such that the sealing ring is held by the sealing body in the annular gap between the rotor and the stator.

13 Claims, 2 Drawing Sheets

SEALING SYSTEM FOR A TURBOMACHINE

CROSS REFERENCE TO RELATED APPLICATIONS

This application claims priority of European application No. 07019667.0 filed Oct. 8, 2007, which is incorporated by reference herein in its entirety.

FIELD OF THE INVENTION

The invention relates to a sealing system for a turbomachine for sealing an annular gap between a rotor and a stator of the turbomachine.

BACKGROUND OF THE INVENTION

A turbomachine is for example a steam turbine that has a stator and a rotor which is surrounded by the stator. The rotor has a shaft and a plurality of rotating blades which are mounted on the shaft in a group as rotating blade stages. The stator has a housing on which a plurality of guide vanes are provided, grouped together as guide vane stages, the guide vane stages being arranged correspondingly to the rotating blade stages.

During operation of the steam turbine steam is expanded over the rotating blade stages and the guide vane stages, thereby rotationally driving the rotor. This causes the rotor to be moved relatively with respect to the stator, with the result that the rotor can rub against the stator. In order to prevent the rubbing of the rotor on the stator as far as possible, an annular gap with respect to the stator is provided around the circumference of the rotor.

During operation of the steam turbine the stator and rotor are exposed to thermal stresses and the rotor in particular is exposed to mechanical stresses due to rotordynamic effects and steam forces. These stresses can lead to the annular gap being bridged during operation of the steam turbine due to deformation of the rotor and/or stator, with the result that the rotor rubs against the stator at least one point.

Generally the pressure of the steam in the steam turbine is reduced along its longitudinal direction, the pressure conditions propagating accordingly into the annular gap. As a result corresponding pressure gradients are produced in the annular gap, in particular in the longitudinal direction of the steam turbine, leading to a leakage flow of steam. The leakage flow causes a decrease in the internal efficiency of the steam turbine. In order to counteract this the height of the annular gap is chosen such that on the one hand the annular gap has the necessary clearance for reliable operation of the steam turbine and on the other hand the leakage flow through the annular gap is small.

Conventionally, a labyrinth seal is installed in the annular gap in order to reduce the leakage flow; said seal can be embodied for example as a see-through labyrinth, full labyrinth, stage labyrinth or as a comb-groove labyrinth.

FIG. 4 shows a conventional comb-groove labyrinth seal 101. An annular gap 104 having a gap height 105 is embodied between a rotor 102 and a stator 103. Arranged in the annular gap 104, the comb-groove labyrinth seal 101 has five sealing strips 106 disposed one after another in series, each being manufactured from an annular plate. The sealing strips 106 are rolled into the surface of the rotor 102 in such a way that the sealing strips 106 bridge the gap height 105 except for an outer radial clearance 109. The surface of the stator 103 is provided with grooves 107 and webs 108 located therebetween, with one of the grooves 107 and one of the webs 108 being arranged in alternation in each case facing one of the sealing strips 106.

If the comb-groove labyrinth seal 101 is provided in the steam turbine, the outer radial clearance 109 is dimensioned such that during operation of the steam turbine the outer radial clearance 109 is as good as never bridged by the sealing strips 106. A bridging of the outer radial clearance 109 can be caused for example by the rotor 102 being placed into radial oscillation due to rotordynamic effects during operation of the steam turbine. Furthermore the rotor 102 and the stator 103 can have a different thermal expansion due to different thermal stresses, with the result that the gap height 105 can vary during operation of the steam turbine.

Should at least one of the sealing strips 106 nonetheless touch the surface of the stator 103 during operation of the steam turbine, then said sealing strip 106 inscribes itself into the surface of the stator 103 with consequent material abrasion. At the same time the sealing strip 106 heats up due to friction, as a result of which a change in the material structure can occur in the sealing strip 106. This can lead to the strength of the sealing strip 106 being impaired.

The leakage rate of the comb-groove labyrinth seal 101 is essentially predetermined by the outer radial clearance 109, since this defines the effective cross-section of the comb-groove labyrinth seal 101. The smaller the outer radial clearance 109 of the comb-groove labyrinth seal 101, the higher is the leakage rate of the comb-groove labyrinth seal 101. Conversely, the larger the outer radial clearance 109 of the comb-groove labyrinth seal 101, the higher is the operating reliability against rubbing of the comb-groove labyrinth seal 101. Accordingly the comb-groove labyrinth seal 101 is conventionally provided with the outer radial clearance 109 of the kind in which the comb-groove labyrinth seal 101 has sufficient operating reliability, the resulting leakage rate of the comb-groove labyrinth seal 101 being caused by the outer radial clearance 109.

SUMMARY OF THE INVENTION

The object of the invention is to create a sealing system for a turbomachine for sealing an annular space between a rotor and a stator of the turbomachine, wherein the sealing system has a high level of operating reliability and a low leakage rate.

The inventive sealing system for a turbomachine for sealing an annular gap between a rotor and a stator of the turbomachine has a sealing body which can be inserted into the annular gap and can bridge the latter, said sealing body being embodied elastically and thereby able to compensate for a height variation of the annular gap, and at least one sealing ring which is embedded in the sealing body such that the sealing ring is held by the sealing body in the annular gap between the rotor and the stator.

The annular gap has a gap height which is defined by the distance between the stator and the rotor. As the sealing ring is disposed between the stator and the rotor in the annular gap, the sealing ring blocks the annular gap, with the result that the effective cross-section of the annular gap is reduced by the sealing ring. Since the effective cross-section of the annular gap is approximately directly proportional to the leakage rate of the sealing system, a reduction in the leakage rate of the sealing system is achieved as a result of the sealing ring being disposed in the annular gap between the rotor and the stator.

The sealing body is embodied elastically so that it can thereby compensate for the height variation of the annular gap. The height variation can be caused for example by a rotordynamic effect, whereby the rotor oscillates in the radial direction, and/or by a difference in the thermal expansion of the rotor and the stator in the radial direction. A maximum height variation of the annular gap is associated with reliable operation of the turbomachine when neither the rotor nor the stator touches the sealing ring at any point in the annular gap.

Owing to the elastic embodiment of the sealing body the sealing ring is elastically mounted inside the sealing body, as a result of which the sealing ring is disposed movably in the radial direction. If it happens during operation of the turbomachine that the sealing ring comes into contact with the rotor or stator, the sealing ring can avoid the rotor or stator. As a result contact forces occurring at the point of contact between the sealing ring and the rotor or stator are weak, thereby preventing damage to the sealing system. Thus, for example, the material abrasion on the stator or rotor is slight, the sealing ring wear is minor and the heating of the sealing ring is low. Accordingly only a small amount of play needs to be provided at the outer diameter and inner diameter of the sealing ring in order to ensure adequate operating reliability. As a result the inventive sealing system, while maintaining the same reliability in operation of the turbomachine, has a lower leakage rate compared with the conventional labyrinth seal.

The sealing body preferably has a structure formed from fibers.

The fibers that surround the sealing ring are embodied elastically. As the fibers give, the sealing ring is disposed in a radially movable manner inside the sealing body. Some of the fibers are disposed between the sealing ring and the rotor or stator, thus preventing direct contact between the sealing ring and the rotor or stator. As a result a direct rubbing of the sealing ring against the rotor or stator is advantageously prevented.

Furthermore the fibers make the effective cross-section of the annular gap smaller, so the leakage rate of the sealing system is reduced by the fibers.

It is preferred that the structure is formed from mineral wool and/or that the fibers are manufactured from a polymer.

Extreme thermodynamic conditions prevail in the turbomachine if, for example, the turbomachine is a steam turbine. The sealing system is therefore exposed to high pressures and high temperatures. Because the structure is formed from the mineral wool and/or the fibers are manufactured from a polymer, the structure is equipped to withstand the high pressures and high temperatures.

It is preferred that the sealing ring has a radial extension in the annular gap which is at least two times greater than its extension in the axial direction of the rotor.

As a result the sealing ring is guided radially in the sealing body, thereby restricting an axial movement of the sealing ring.

It is preferred that the inner diameter and/or outer diameter of the sealing ring are/is dimensioned such that when the sealing system is installed in the turbomachine and the sealing ring is arranged concentrically around the rotor in the annular gap, necessary radial clearances between the rotor and the stator are maintained to assure the reliable operation of the turbomachine.

As a result the turbomachine can be operated in a reliable manner, the radial clearances needing to be smaller than in the case of a convention labyrinth seal. Accordingly the inventive sealing system has a lower leakage rate while providing a degree of operating reliability that is comparable with a conventional labyrinth seal.

It is preferred that the sealing system has at least two sealing rings which are disposed at an axial distance from one another so that when the sealing system is installed in the turbomachine the sealing rings do not come into contact with one another during operation of the turbomachine.

Providing a plurality of sealing rings increases the sealing effect of the sealing system, with the result that the leakage rate of the sealing system is low. The fact that the sealing rings cannot touch one another during operation means that the sealing rings cannot mutually damage or obstruct one another. As a consequence the operating reliability of the sealing system is high.

The sealing ring is preferably manufactured from sheet steel or from a polymer.

The sheet steel or the polymer has a high strength and is easy and economical to manufacture.

It is preferred that the sealing system has a rotor coating which can be applied to the rotor in the annular gap and/or stator coating which can be applied to the stator, the surface of the rotor coating and/or stator coating being embodied such that the sealing body can either slide in a low-friction and low-wear manner over the surface or be entrained by the surface.

If, for example, the rotor has the rotor coating that has the surface by means of which the sealing body can be entrained, and the stator has the stator coating that has the surface on which the sealing body can slide in a low-friction and low-wear manner, the sealing body is entrained by the rotor during operation of the turbomachine with the result that the sealing body moves relative to the stator with the rotational speed of the rotor and slides along the stator coating. This causes predefined movement ratios to become established in the sealing system, thus preventing damage to the sealing system due to unexpected movements. Furthermore a low degree of wear obtains at the stator surface, with the result that the sealing body has a long service life.

The rotor coating and/or stator coating are/is preferably manufactured from polytetrafluoroethylene.

Polytetrafluoroethylene advantageously has a low coefficient of friction and high strength. Polytetrafluoroethylene is also heat-resistant, so it can withstand a high thermal load.

It is preferred that the turbomachine is a steam turbine, a compressor or a gas turbine.

If the turbomachine is a gas turbine, the sealing system is preferably provided in the region of the compressor of the gas turbine.

BRIEF DESCRIPTION OF THE DRAWINGS

The invention is explained below with reference to a preferred exemplary embodiment of the inventive sealing system and with reference to the attached schematic drawings, in which.

DETAILED DESCRIPTION OF THE INVENTION

Figure 1:
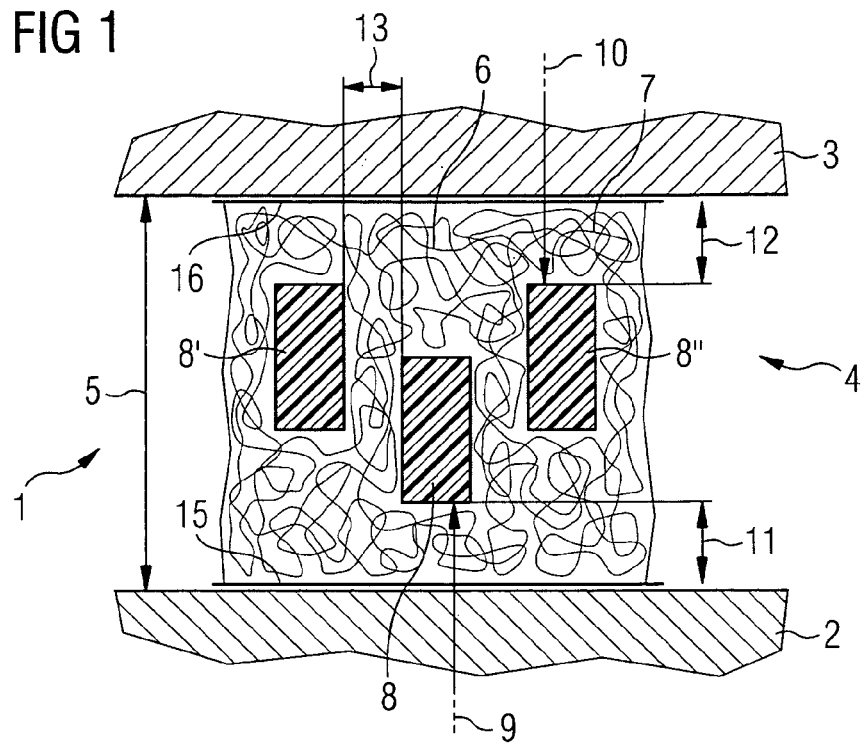
FIG. 1 shows a longitudinal section through the exemplary embodiment of the sealing system with normal gap height.
Figure 2:
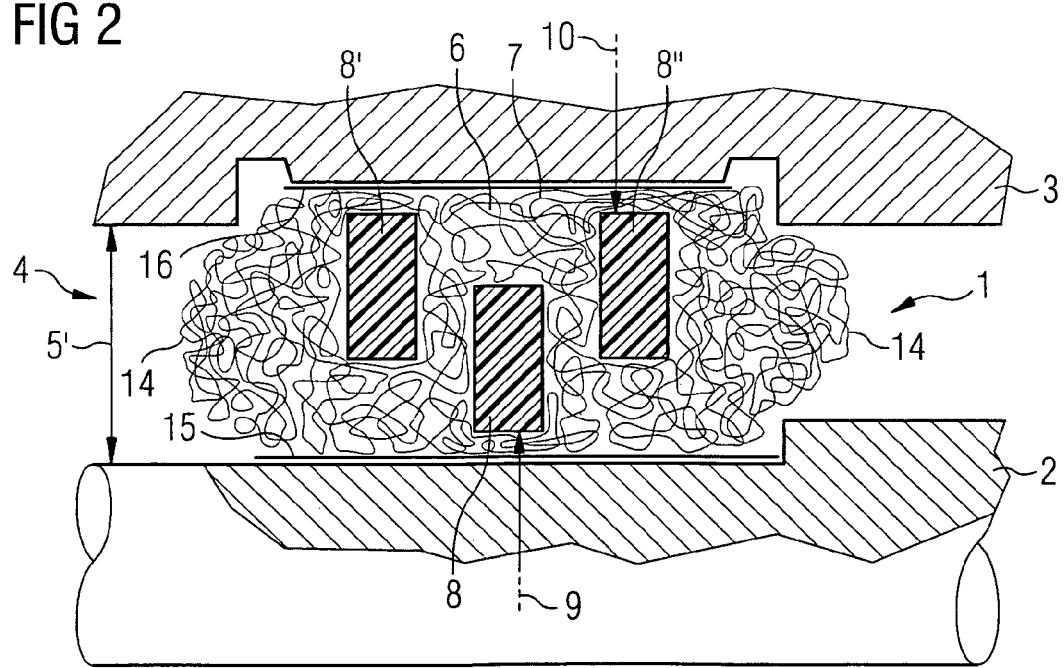
FIG. 2 shows the longitudinal section from FIG. 1 with reduced gap height.
Figure 3:
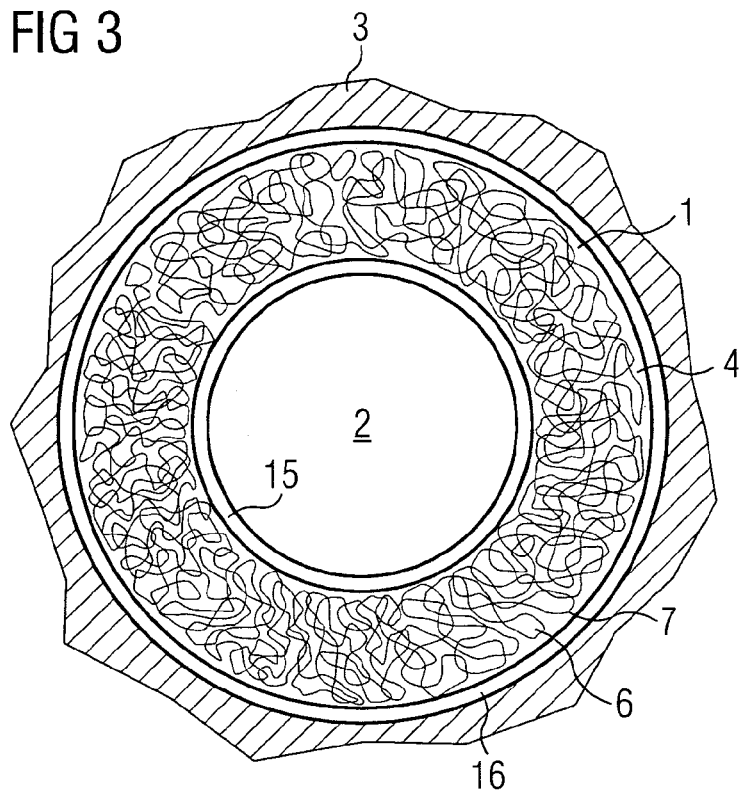
FIG. 3 shows a cross-section through the exemplary embodiment of the sealing system.
Figure 4:
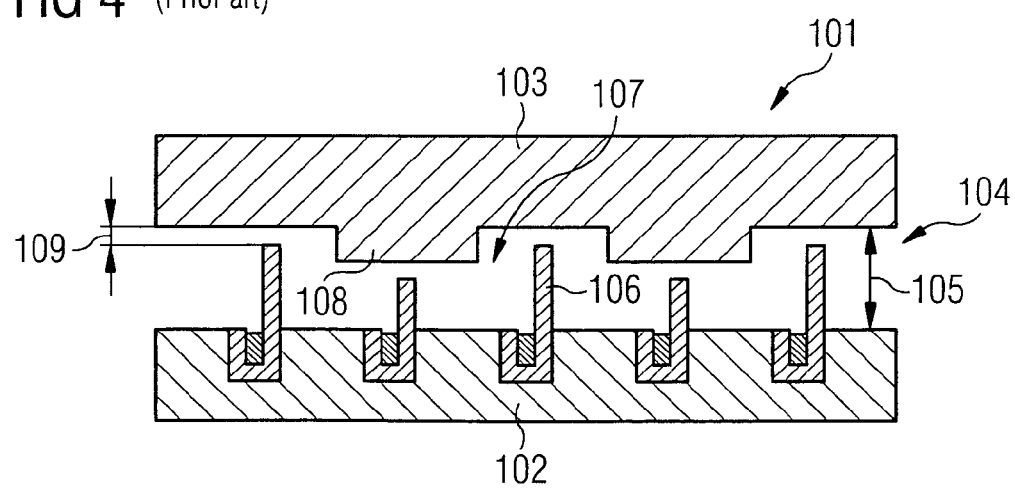
FIG. 4 shows a conventional comb-groove labyrinth seal.

As can be seen from FIGS. 1 to 3, a sealing system 1 is installed between a rotor 2 and a stator 3. Between the rotor 2 and the stator 3 there extends an annular gap 4 having a gap height 5 which bridges the sealing system 1 in that it is installed in the annular gap 4.

The sealing system 1 has a sealing body 6 which consists of a plurality of fibers 7. The fibers 7 are resiliently flexible and have an unordered distribution in the sealing body 6. The sealing body 6 is thus formed as a structure that is not woven by the fibers 7 and is elastic.

The sealing system 1 also has three sealing rings 8, 8', 8" which are embedded in the sealing body 6. The sealing rings 8 are arranged concentrically around the rotor 2 in the annular gap 4. The sealing rings 8 each have an inner diameter 9 and an outer diameter 10. The inner diameter 9 is dimensioned such that in the case of a concentric position of the sealing ring 8 the inner diameter 9 has a minimum necessary inner radial clearance 11 with respect to the rotor 2. Furthermore the outer diameter 10 of the sealing ring 8 is dimensioned such that the distance between the outer diameter 10 and the stator 3 has a minimum necessary outer radial clearance 12. The minimum necessary inner radial clearance 11 and the minimum necessary outer radial clearance 12 are dimensioned such that under normal operating conditions the rotor 2 can rotate in the stator 3 without the sealing system 1 suffering damage in the event of possible radial movements of the rotor 2.

As seen in FIGS. 1 and 2, the sealing rings 8' and 8" have essentially the same outer diameter 10, whereas the sealing ring 8 has a smaller outer diameter 10. Moreover, the sealing rings 8' and 8" have essentially the same inner diameter 9, whereas the sealing ring 8 has a smaller inner diameter 9. In order to assure the reliable operation of the sealing system 1 the inner diameter 9 of the sealing ring 8 is dimensioned so as to maintain the minimum necessary inner radial clearance 11. Also, the outer diameter 10 of the sealing ring 8' and the sealing ring 8" is dimensioned such that in the case of the concentric position of the sealing rings 8', 8" around the rotor 2 the minimal necessary outer radial clearance 12 is maintained.

The sealing rings 8, 8' and 8" are arranged at an axial distance 13 from one another so that the sealing rings 8, 8' and 8" do not touch one another during operation of the sealing system 1.

FIG. 1 shows the sealing system 1 with the normal gap height 5 of the annular gap 4. FIG. 2 shows the sealing system 1 with a reduced gap height 5' of the annular gap 4. Because the sealing body 6 is embodied as elastic, the sealing body 6 is radially compressed by the rotor 2 and the stator 3 correspondingly by the gap height reduction from the gap height 5 to the gap height 5'. The consequence of this is that bulges 14 are formed accordingly at the front ends of the sealing body 6.

The surface of the rotor 2 is provided with a rotor coating 15, and the surface of the stator 3 is provided with a stator coating 16. The rotor coating 15 and the stator coating 16 are disposed in such a way that the sealing body 6 comes to rest on them. The rotor coating 15 is implemented in such a way that it has a high coefficient of friction at the contact point with the sealing body, the rotor coating 15 being embodied as rough at its surface. Furthermore the stator coating 16 is implemented such that it has a low coefficient of friction at its contact point with the sealing body 6, the stator coating 16 being embodied as smooth at its surface. Thus, during the rotation of the rotor 2 the sealing body 6 is entrained by the rotor coating 15, while the sealing body 6 slides in a low-wear manner on the stator coating 16.

The invention claimed is:

1. A sealing system for a turbomachine for sealing an annular gap between a rotor and a stator of the turbomachine, comprising:
   a sealing body inserted into the annular gap that bridges the annular gap and elastically compensate for a height variation of the annular gap, wherein a height of the sealing body varies correspondingly with the height variation of the annular gap; and
   a sealing ring that is held in the sealing body in the annular gap between the rotor and the stator to block the annular gap,
   wherein the sealing ring is configured to have an inner diameter that is dimensioned to maintain an inner radial clearance between the rotor and the stator during an operation of the turbomachine to prevent damage of the sealing ring in an event of a radial movement of the rotor,
   wherein the sealing ring is configured to have an outer diameter that is dimensioned to maintain an outer radial clearance between the rotor and the stator during an operation of the turbomachine to prevent damage of the sealing ring in the event of the radial movement of the rotor,
   wherein the sealing system comprises at least two sealing rings which are disposed at an axial distance from one another, and
   wherein the at least two sealing rings are configured to have inner diameters and outer diameters that are dimensioned differently from each other to maintain the inner radial clearance and the outer radial clearance between the rotor and the stator.

2. The sealing system as claimed in claim 1, wherein the sealing body comprises a structure that is formed from mineral wool.

3. The sealing system as claimed in claim 1, wherein the sealing body comprises a structure that is formed from fibers.

4. The sealing system as claimed in claim 3, wherein the fibers are manufactured from a polymer.

5. The sealing system as claimed in claim 1, wherein the sealing ring comprises a radial extension in the annular gap which is at least two times greater than an extension in an axial direction of the rotor.

6. The sealing system as claimed in claim 1, wherein the sealing ring is arranged concentrically around the rotor in the annular gap.

7. The sealing system as claimed in claim 1, wherein the sealing ring is manufactured from a sheet steel.

8. The sealing system as claimed in claim 1, wherein the rotor or the stator in the annular gap comprises a coating.

9. The sealing system as claimed in claim 8, wherein the sealing body slides low-frictionally and low-wearly over a surface of the coating or is entrained by the surface of the coating.

10. The sealing system as claimed in claim 8, wherein the coating is manufactured from polytetrafluoroethylene.

11. The sealing system as claimed in claim 1, wherein the turbomachine is selected from the group consisting of: a steam turbine, a compressor, and a gas turbine.

12. The sealing system as claimed in claim 1, wherein the sealing ring is manufactured from a polymer.

13. A method for sealing an annular gap between a rotor and a stator of a turbomachine, comprising:
   bridging the annular gap by inserting a sealing body into the annular gap;
   elastically compensating for a height variation of the annular gap by the sealing body so that a height of the sealing body varies correspondingly with the height variation of the annular gap; and
   holding a sealing ring in the sealing body in the annular gap between the rotor and the stator to block the annular gap,
   wherein the sealing ring comprises an inner diameter that is dimensioned to maintain an inner radial clearance between the rotor and the stator during an operation of the turbomachine to prevent damage of the sealing ring in an event of a radial movement of the rotor, wherein the sealing ring comprises an outer diameter that is dimensioned to maintain an outer radial clearance between the rotor and the stator during an operation of the turbomachine to prevent damage of the sealing ring in the event of the radial movement of the rotor, wherein the sealing system comprises at least two sealing rings which are disposed at an axial distance from one another, and wherein the at least two sealing rings are configured to have inner diameters and outer diameters that are dimensioned differently from each other to maintain the inner radial clearance and the outer radial clearance between the rotor and the stator.

* * * * *